United States Patent [19]

Roerig et al.

[11] Patent Number: 4,837,907
[45] Date of Patent: Jun. 13, 1989

[54] SELF-LOADING CONTROLLED DEFLECTION ROLL

[75] Inventors: Arnold J. Roerig, Beloit, Wis.; Richard R. Hergert, Rockton, Ill.

[73] Assignee: Beloit Corporation, Beloit, Wis.

[21] Appl. No.: 87,555

[22] Filed: Aug. 20, 1987

[51] Int. Cl.$^4$ .............................................. B21B 27/00
[52] U.S. Cl. ..................... 29/115; 29/116.2; 29/129.5
[58] Field of Search ............. 29/115, 116.1, 116.2, 29/129.5; 100/172

[56] References Cited

U.S. PATENT DOCUMENTS

| | | |
|---|---|---|
| Re. 27,445 | 8/1972 | Kuehn . |
| 3,286,325 | 11/1966 | Justus . |
| 3,481,016 | 12/1969 | Cournoyer et al. . |
| 3,639,956 | 2/1972 | Justus . |
| 3,766,620 | 10/1973 | Roerig ................................ 29/115 |
| 3,855,681 | 12/1974 | Andriola et al. . |
| 3,885,283 | 5/1975 | Biondetti . |
| 3,889,334 | 6/1975 | Justus et al. ........................ 29/115 |
| 3,997,952 | 12/1976 | Lehmann et al. . |
| 4,000,979 | 1/1977 | Biondetti .......................... 29/115 |
| 4,048,701 | 9/1977 | Marchioro . |
| 4,062,252 | 12/1977 | Matikainen . |
| 4,111,065 | 9/1978 | Matikainen et al. . |
| 4,271,574 | 6/1981 | Matikainen ...................... 29/115 |
| 4,352,228 | 10/1982 | Iso Aho . |
| 4,402,233 | 9/1983 | Toivonen et al. . |
| 4,414,890 | 11/1983 | Schiel et al. . |
| 4,510,823 | 4/1985 | Leech ................................ 29/115 |
| 4,520,723 | 6/1985 | Pav et al. . |
| 4,691,421 | 9/1987 | Schiel . |

FOREIGN PATENT DOCUMENTS 2909277 9/1980 Fed. Rep. of Germany .

Primary Examiner—Howard N. Goldberg
Assistant Examiner—Irene Cuda
Attorney, Agent, or Firm—Dirk J. Veneman; Raymond W. Campbell; Gerald A. Mathews

[57] ABSTRACT

A self-loading controlled deflection roll is rotatably mounted with non-self-aligning bearings at either end to bearing housings which, in turn, are pivotally-mounted to support stands. The stationary support beam extending through the roll is pivotally-mounted in the same support stands. At one end of the roll, a drive shaft having a drive gear engaging a ring gear which is mounted on the end of the roll shell concentric with its surface is provided to rotatably drive the roll shell while simultaneously permitting lateral movement of the roll shell relative to the support beam during the self-loading phase of roll operation.

2 Claims, 3 Drawing Sheets

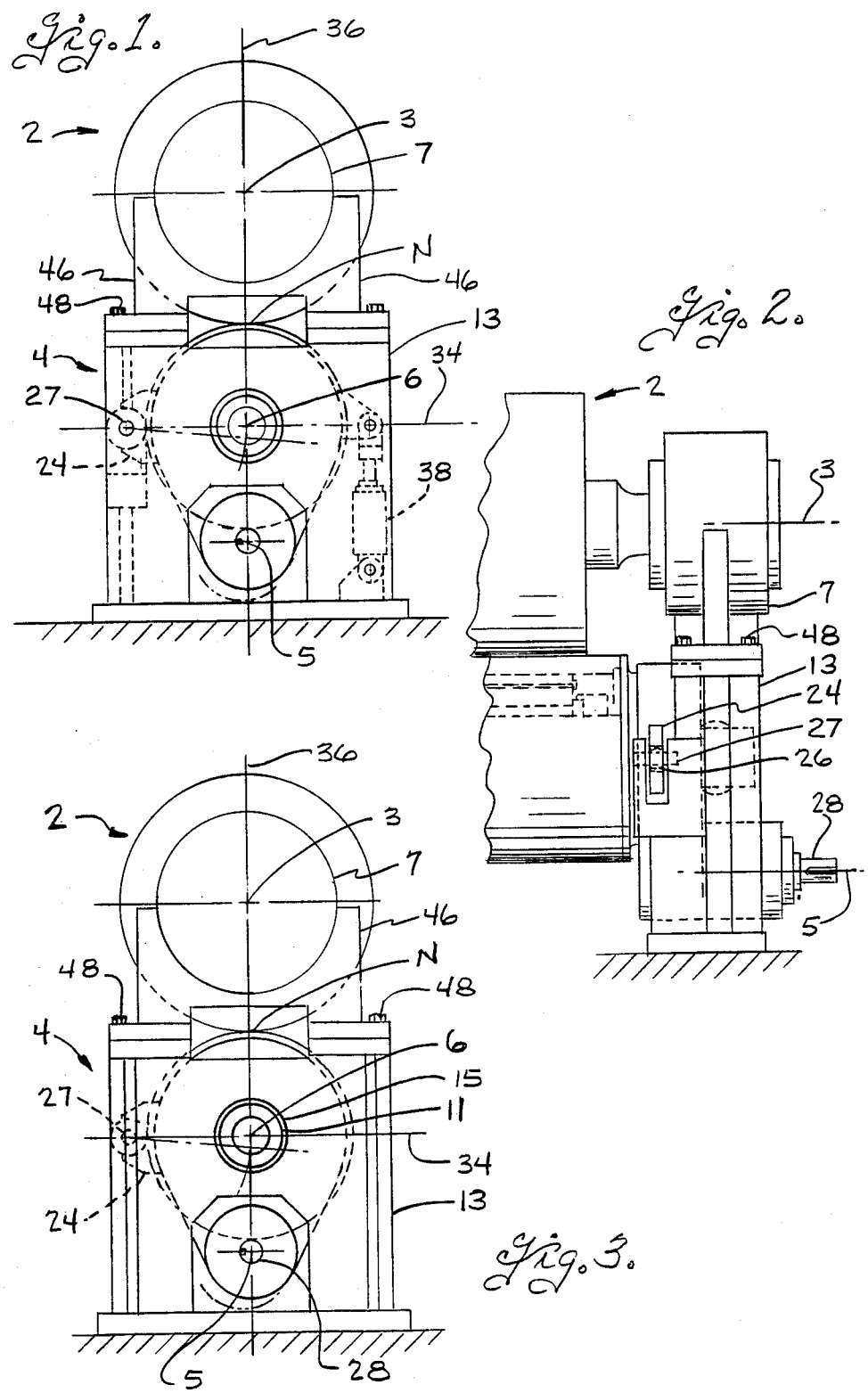

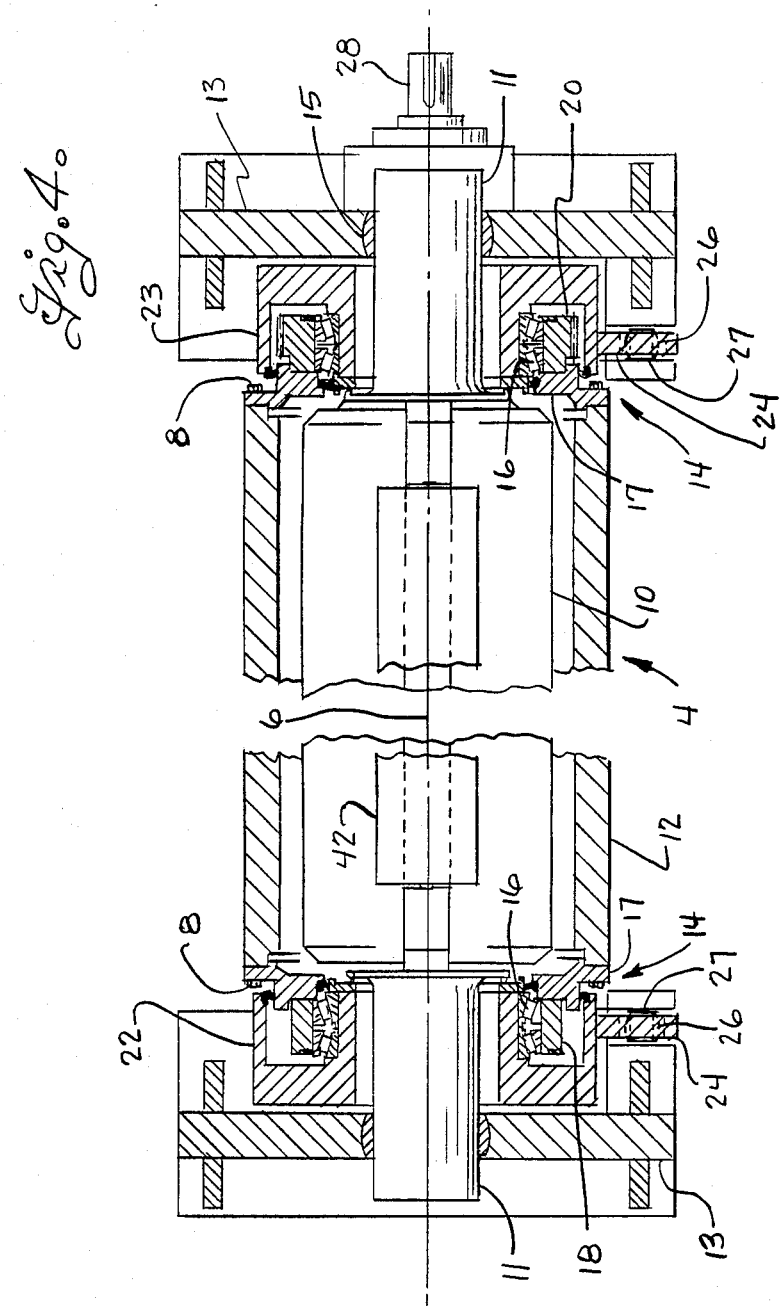

SELF-LOADING CONTROLLED DEFLECTION ROLL

BACKGROUND OF THE INVENTION

This invention relates to rolls for processing travelling web material, such as paper being made on a papermaking machine. More particularly, this invention relates to a so-called self-loading controlled deflection roll wherein pressure means is located within the roll to exert force against the inner peripheral surface of the roll shell at one or more locations to control the deflection of the roll shell along a longitudinally-extending line on its surface to be straight, or curved upwardly or downwardly, a controlled amount, as desired. Still more particularly, this invention relates to a self-loading controlled deflection roll wherein the roll shell is capable of being driven while simultaneously being moved laterally, or transversely, relative to its longitudinal axis.

Self-loading controlled deflection rolls are known. Examples are shown and described in U.S. Pat. Nos. 3,885,283, 4,048,701 and 4,520,723. There are also many arrangements for driving controlled deflection rolls. These designs are often complicated due to the fact that the roll shell must be driven relative to its stationary support beam. This is further complicated by the fact that the roll shell must accommodate some flexing which occurs during operation of its controlled deflection structure, and the roll surface must be capable of moving into, and out of, nip engagement with a mating roll.

Prior self-loading controlled deflection rolls utilize self-aligning bearings on either end to accommodate the small, but significant, flexule motion of the roll shell about an axis transverse to its axis of rotation. Prior self-loading controlled deflection rolls also utilize a drive gearbox which requires its own bearings to support it independent of the roll shell.

Some prior self-loading controlled deflection rolls utilize sliding collars, or yokes, on which the inner race of the bearings on which the roll shell is rotatably mounted are in turn mounted to the sliding yokes to provide the lateral movement of the roll shell relative to the stationary roll shaft, or support beam. Such an arrangement is shown and described in the Biondetti, U.S. Pat. No. 3,885,283. This arrangement requires close tolerances for accurate operation, but these same close tolerances require costly accurate finishing of the surfaces brought into sliding engagement. On the other hand, loose tolerances can permit undesirable vibration.

Prior arrangements for driving a controlled deflection roll are very complex due to the need to support the stationary roll support beam while providing driving force to the roll shell. These arrangements often necessitated the use of triple-race bearings which are extremely expensive. Finally, controlled deflection rolls driven by any prior drive which is concentric with the longitudinal axis of the support beam can't accommodate lateral movement of the roll shell relative to the support beam.

SUMMARY OF THE INVENTION

This invention provides apparatus which permits self-loading of the roll shell into nipping engagement with a mating roll without having to move the support beams of either roll. It also provides controlled deflection operation of the roll where the entire roll shell can move laterally relataive to its longitudinal axis of rotation. Finally, it provides both the self-loading and controlled deflection operations of the roll while simultaneously providing direct drive of the roll shell relative to the stationary support beam.

In this invention, the roll shell is mounted to an end assembly which is supported in a bearing housing on non-self-aligned bearings, such as tapered roller bearings. This establishes and maintains a rigid alignment between the roll shell and the bearing housing.

At one end of the roll, a ring gear comprises part of the end assembly and is also thereby rigidly aligned with the bearing housing at that end. A driveshaft having a drive gear is rotatably mounted in this bearing housing with the drive gear in engagement with the ring gear to provide rotational drive for the roll shell. Since the driveshaft is mounted in the same bearing housing as the ring gear driving the roll shell, alignment of the drive gear and ring gear is established and maintained under all operating conditions.

The bearing housings at either end of the roll are pivotally-attached to support stands at a location offset from the longitudinal axis of the roll. The center support beam of the roll is also pivotally-supported in these same support stands. This arrangement allows for movement of the bearing housings and roll shell surface relative to the center shaft.

Within the controlled deflection roll is one or more pressure elements, such as shoes, which are actuated by one or more pistons to provide lateral movement of the roll shell and/or deflection control, as desired, which is independent of any movement of the roll support beam. This permits the support stands at either end of the roll to be mounted directly to the support stands, or bearing housings, of a roll to be mated in nipping engagement with the self-loading controlled deflection roll.

Accordingly, when it is desired to open or close the nip between mating rolls, or to control the deflection of the controlled deflection roll, the forces exerted between the support beam and roll shell are taken up entirely by the connections between the support stands of the two rolls and no nip loading forces are transmitted to the machine framework supporting either of the rolls.

Since non-self-aligned bearings are used to support the roll shell, rigid alignment of the roll shell relative to the bearing housing is maintained and the bearing housings can, therefore, be used as a gear box. This permits the driveshaft and drive gear to be mounted in the same bearing housing as the ring gear which drives the roll shell.

Accordingly, it is an object of this invention to provide a self-loading controlled deflection roll wherein the roll drive is combined with the shell bearing mounting and housing.

Another object of this invention is to provide a self-loading controlled deflection roll wherein the roll shell is not supported by self-aligning bearings.

Still another object of this invention is to provide a self-loading controlled deflection roll wherein the function of the gearbox bearings and the shell rotatable support bearings are combined.

A feature and object of this invention is the provision of a controlled deflection roll wherein the bearings maintain rigid alignment between the roll shell and the bearing housings.

Another feature of this invention is the provision of a self-loading controlled deflection roll having bearing housings which are externally pivoted.

Yet another feature and advantage of the invention is the provision of a self-loading controlled deflection roll which is simple in construction and which can use external pressure cylinders to either lift the roll into, or out of, nipping engagement, or to apply edge pressure at the edges of mating rolls.

These, and other, objects, features and advantages of the invention will be readily apparent to those skilled in the art upon reading the following description of the preferred embodiments in conjunction with the attached drawings and claims.

BRIEF DESCRIPTION OF THE DRAWINGS

FIG. 1 is an end elevational view of the self-loading controlled deflection roll mounted beneath a mating roll and having pressure cylinders attached to each bearing housing.

FIG. 2 is a side elevational view of one end of the roll couple shown in FIG. 1.

FIG. 3 is an end elevational view of the self-loading controlled deflection roll and mating roll similar to the apparatus shown in FIG. 1, but without the pressure cylinders between the bearing housings and support stands.

FIG. 4 is a top sectional view of the self-loading controlled deflection roll.

DESCRIPTION OF THE PREFERRED EMBODIMENTS

Figure 5:
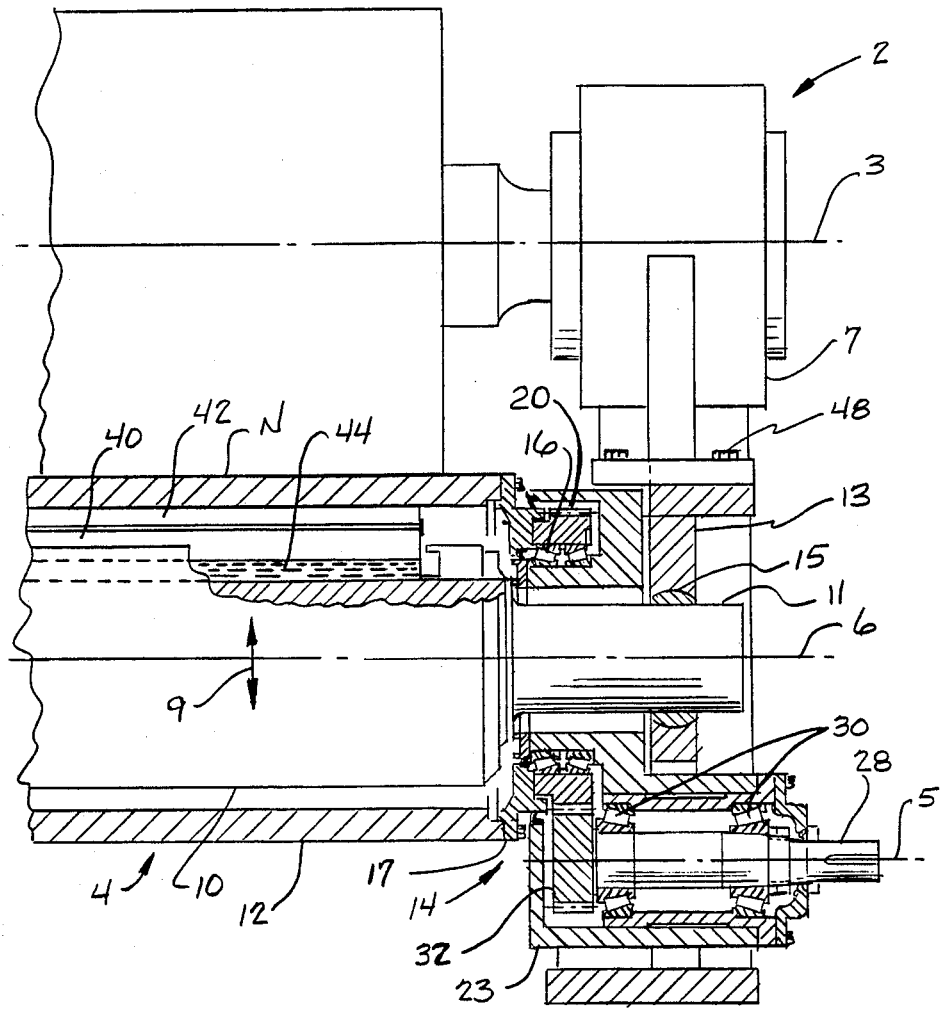
FIG. 5 is a side elevational view, partially in section, of the apparatus shown in FIG. 2.

With particular reference to FIGS. 4 and 5, a self-loading controlled deflection roll 4 is shown which has a stationary support beam 10 and its end journals 11 pivotally mounted into support stands 13 at either end. A hollow, cylindrical roll shell 12 is disposed about the support beam. One or more bearing support shoes 42, which operate according to either the well known hydrostatic or hydrodynamic principles, and supported by one or more pistons 40 mounted in corresponding cavities in the support beam 10, are disposed in the space between the support beam and the inner surface of the roll shell to provide support elements of the roll shell on the beam. At either end of the roll shell is a roll end assembly 14 which includes a circular flange 17 that is attached with capscrews 8 so as to be concentric with the roll shell about its longitudinal axis 6. Securely attached in the roll end assembly at the front end of the roll is a bearing ring 18. Similarly, attached in the roll end assembly at the back end of the roll is a ring gear 20. Thus, the roll end assemblies comprise flanges 14 and bearing ring 18 or ring gear 20.

At the front end of the roll is a front bearing housing 22 and at the rear end of the roll is a rear bearing housing 23. The roll bearing ring 18 and ring gear 20 of the end assemblies are rotatably mounted in the bearing housings by tapered roller bearings 16. These tapered roller bearings are non-self-aligning bearings. The significance of this fact is that tapered roller bearings do not permit any pivotal motion between their inner and outer races about an axis transverse to their axis of revolution. Thus, the bearing ring 18 and ring gear 20 also cannot move about an axis transverse to the axis of roll shell rotation.

Referring to FIGS. 1-3, the bearing housings 22,23 are, in turn, pivotally mounted to the support stands 13 with pivot arms 24 in which spherical bushings 26 are mounted to rotate about shafts or pins 27. These bearing housing pivots are located in a plane 34 (FIGS. 1 and 3) which is essentially horizontal and which is perpendicular to plane 36 which extends through the axes of rotation 6,3 of the self-loading controlled deflection roll 4 and its mating roll 2, respectively, shoe 42 and the nip line N of contact therebetween.

Referring to FIG. 5, a driveshaft 28 is mounted in back bearing housing 23 with driveshaft bearings 30 near either end to rotate about its longitudinal axis 5 which is parallel to axis 6 about which roll shell 12 rotates. A drive gear 32 is secured to the driveshaft and engages the ring gear 20. Since the driveshaft 28 and ring gear 20 are both secured in the same bearing housing 23, rigid alignment of drive gear 32 and ring gear 20 is maintained since the ring gear bearings 16 are not self-aligning bearings. In other words, the tapered roller bearings maintain rigid alignment of their inner and outer races, and corresponding alignment of the ring gear in the bearing housing.

In another embodiment, shown in FIG. 1, pressure cylinders 38 are mounted between the support stands 13 and front and back bearing housings 22,23 to provide pivotal movement of the self-loading controlled deflection roll 4 about their pivot shafts 27. When the controlled deflection roll is mounted in the lower position relative to a mating roll 2, as shown in FIG. 1, these pressure cylinders 38, which typically take the form of hydraulic cylinders actuated by pressurized hydraulic fluid, can be operated to increase or decrease the loading applied to the edges of the roll due to the proximity of their attachment to the bearing housings through their pivot arms 24. In the manufacture of paper, regardless of whether the controlled deflection roll is used in the press or calender sections of a papermaking machine, such control of the edges of the paper web travelling through the machine is vital to ensure uniformity of paper caliper and finish in the cross-machine direction.

When the controlled deflection roll is mounted in the upper position relative to its mating roll 2, such as if the embodiment shown in FIG. 1 were rotated 180°, pressure cylinders 38 could be actuated to raise roll 4 upwardly and away from nipping engagement with its mating roll 2. This would avoid the necessity of otherwise providing some internal apparatus, such as a pressurized piston and shoe arrangement mounted in the controlled deflection roll shaft opposite the piston 40 and shoe 42. In this upper position, pressure cylinders 38 can also be used to effect changes in pressure applied to the edges of the nip line of contact N between the mating rolls and, thereby, control the web caliper and finish at these locations.

In operation, with reference to FIGS. 4 and 5, controlled deflection roll 4 is pivotally secured into its stand 13 by its journals 11. Its roll shell 12 is rotatably mounted on its non-self-aligned bearings, such as tapered roller bearings 16, within front and back bearing housings 22,23 which are pivotally mounted to stands 13 by pivot shafts 27. Driveshaft 28 is linked with a flexible drive (not shown) to a source of power, such as a motor which also is not shown, and rotates drive gear 32 which engages ring gear 20 to rotate the roll shell.

A supply of pressurized fluid, such as hydraulic oil 44, in the controlled deflection roll is urged against the bottom of one or more pistons 40 to cause one or more shoes 42 to apply force to the inner surface of roll shell 12 beneath nip line N and either control its deflection or produce a crown in the surface of the roll shell along its nip line of contact N with mating roll 2. The manner in which the controlled deflection roll applies force to the inner side of the roll shell is well known in the art, and, therefore, it will not be discussed in further detail. In this regard, reference is made to U.S. Pat. No. 3,276,102 whose teaching is incorporated herein by reference. One or more pistons, with one or more corresponding shoes, can be used as the support elements to support the roll shell 12 relative to the roll shaft 10. Similarly, the operation of the shoes can be according to either the well known hydrostatic or hydrodynamic principles.

Actuation of the shoe and piston support elements cause the roll shell 12 to move laterally, or transversely, relative to the longitudinal axis 6 as shown by double-headed arrow 9. Since the support beam 10 is secured by its journals in stands 13, the actuation of the piston and consequential transverse movement of the roll shell causes the front and back bearing housings 22,23 to rotate upwardly, with reference to FIG. 3, about pivot shafts 27. In this upwardly extended, or loaded, position, the roll axis of rotation 6 is no longer coincident with the longitudinal axis of the roll through its journals. There is no skewing or relative motion between the driveshaft 28, gears 32, 20 and the roll shell 12 since they all move with back bearing housing 23. The roll is thus self-loading in that the roll shell 12 is moved laterally into nipping engagement with a mating roll 2 by actuation of the internal support elements of the roll itself. The reaction forces on the support beam 10 may cause some downward deflection of the beam. This deflection is accommodated by the spherical bushings 15 on journals 11 in the support stands 13 on either end of the roll. Mating roll 2 is held into engagement with the controlled deflection roll 4 by having its bearing housings 7 and support stands 46, which can be integral, secured to the support stands 13 by bolts 48. All nip loading and reaction forces are taken up by the support stands and the bolts holding them together. No loads are transmitted to any swing arms since there aren't any, or to any of the papermaking machine framework.

After the rolls have been loaded into nipping engagement, further actuation of the piston, or pistons, can be effected to control the deflection of the roll shell along its nip line of contact in a manner well known in the art.

When it is desired to unload the rolls from nipping engagement, the piston, or pistons, are deactuated and the roll shell 12 pivots downwardly about its pivot shafts 27 to create a gap between rolls 2 and 4.

In the embodiment shown in FIG. 1, the operation is essentially the same as described above, however, pressure cylinders 38 pivotally link the bearing housings 22,23 with the support stands 13. The pressure cylinders can be used to effect, or augment, the loading and unloading of the controlled deflection roll, if desired.

Thus, a self-loading controlled deflection roll which achieves the objectives and includes the features and advantages set forth has been disclosed. Variations in the specific structures disclosed in the preferred embodiments may be made without departing from the spirit and scope of the invention as claimed. For example, while tapered roller bearings have been recited in the preferred embodiment, this is by way of example only and any other bearing which can maintain rigid alignment between the ring gear and roll shell can be used.

Also, while the bearing housings have been shown and described in the preferred embodiment as being pivotally-supported and linked in the support stands, other means for supporting and linking the bearing housings with the support stands, such as by sliding pins and stops are contemplated and intended to be within the scope of the invention.

What is claimed is:

1. A self-loading controlled deflection roll for use in engaging a mating roll along a nip line of contact therebetween, said roll comprising:
   a stationary support beam;
   a rotatable roll shell disposed about the beam and defining a space therebetween;
   end support means pivotally supporting the ends of the support beam;
   roll end assembly means secured on each end of the roll shell, including a ring gear at one end of the roll shell, said ring gear being rigidly secured relative to the end of the roll shell;
   bearing housings disposed about the ends of the roll shell and movably linked and supported on the end support means;
   bearings mounted in the bearing housings intermediate the roll end assembly means which rotatably support the roll shell and maintain rigid alignment between the roll shell and the bearing housings;
   roll shell support element means mounted in the beam in the space for providing laterally-movable and rotatable support of the roll shell relative to the beam;
   drive means mounted in a bearing housing, independent of the end support means, the drive means including a gear engaging the ring gear for providing rotatable movement of the roll shell relative to the support beam.

2. A self-loading controlled deflection roll as set forth in claim 1, wherein:
   the bearing housings are pivotally-supported on the end support means in a plane extending through the pivots and roll at substantially 90° to a plane through the roll shell axis of rotation and the intended nip line of contact on the roll shell with a mating roll.

* * * * *